(12) United States Patent
Haumont et al.

(10) Patent No.: US 7,742,451 B2
(45) Date of Patent: *Jun. 22, 2010

(54) METHOD AND APPARATUS FOR THE TRANSMISSION OF PACKETS OF DATA

(75) Inventors: Serge Haumont, Helsinki (FI); Kanerva Mikko, Espoo (FI); Kari Hannu, Espoo (FI); Dinesh K. Anvekar, Espoo (FI); Soininen Pekka, Espoo (FI); Shreekant Lakshmeshwar, Espoo (FI)

(73) Assignee: Nokia Corporation, Espoo (FI)

( * ) Notice: Subject to any disclaimer, the term of this patent is extended or adjusted under 35 U.S.C. 154(b) by 1112 days.

This patent is subject to a terminal disclaimer.

(21) Appl. No.: 11/290,528

(22) Filed: Dec. 1, 2005

(65) Prior Publication Data

US 2006/0083184 A1  Apr. 20, 2006

Related U.S. Application Data

(63) Continuation of application No. 09/765,144, filed on Jan. 18, 2001, now Pat. No. 7,012,905, which is a continuation of application No. PCT/EP99/04979, filed on Jul. 14, 1999.

(30) Foreign Application Priority Data

Jul. 21, 1998  (GB)  ................................. 9815886.8

(51) Int. Cl.
   *H04W 4/00*  (2009.01)
(52) U.S. Cl. .................. 370/331; 370/236; 455/436
(58) Field of Classification Search ......... 370/331–333, 370/235–236, 328, 350, 389, 392, 394, 229, 370/252; 455/435.1, 436, 437, 442, 422.1
See application file for complete search history.

(56) References Cited

U.S. PATENT DOCUMENTS 5,530,693 A  6/1996  Averbuch et al.

(Continued)

FOREIGN PATENT DOCUMENTS

EP  0777396 A1  6/1997

OTHER PUBLICATIONS

G. Brasche and Prof. Dr. Ing. B. Walke; "Analysis of Multi-Slot MAC Protocols proposed for the GSM Phase 2+ General Packet Radio Service", 1997 IEEE 47th: Vehicular Technology Conference, Phoenix, May 4-7, 1997, vol. 2, No Conference 47, May 4, 1997, Institute of Electrical and Electronics Engineers, pp. 1295-1300.

(Continued)

*Primary Examiner*—Brian D Nguyen
(74) *Attorney, Agent, or Firm*—Squire, Sanders & Dempsey L.L.P.

(57) ABSTRACT

A method of transmitting packets of data in a communication network comprising at least first to third stations, the method comprising the steps of sending a first number of the data packets from the first station to a second station; identifying which of the first number of packets are correctly received by the second station from the first station; and sending a second number of data packets from the third station to said second station commencing with the packet identified as being required after the last correctly received packet received form the first station.

47 Claims, 3 Drawing Sheets

U.S. PATENT DOCUMENTS

| | | | |
|---|---|---|---|
| 5,864,578 A | 1/1999 | Yuen | |
| 6,104,757 A | 8/2000 | Rhee | |
| 6,163,704 A * | 12/2000 | Joong et al. | 455/466 |
| 6,173,183 B1 | 1/2001 | Abu-Amara et al. | |
| 6,295,450 B1 * | 9/2001 | Lyer et al. | 455/436 |
| 6,381,463 B1 | 4/2002 | Tu et al. | |
| 6,438,116 B1 | 8/2002 | Corbett | |
| 6,510,319 B2 | 1/2003 | Baum et al. | |
| 6,553,064 B1 | 4/2003 | Chen et al. | |
| 6,580,910 B1 * | 6/2003 | Mazur et al. | 455/440 |

OTHER PUBLICATIONS

International Search Report for PCT/EP99/04979.

* cited by examiner

METHOD AND APPARATUS FOR THE TRANSMISSION OF PACKETS OF DATA

This is a Continuation of application Ser. No. 09/765,144 now U.S. Pat. No. 7,012,905, filed Jan. 18, 2001, which in turn is a Continuation of International Application No. PCT/EP99/04979, filed Jul. 14, 1999, both of which are incorporated by reference in their entirety herein.

The present invention relates to a method and apparatus for transmitting packets of data in a wireless communication network and, in particular, but not exclusively in a cellular telecommunication network.

In wireless communication systems such as cellular telecommunication networks, the area covered by the network is divided into a number of cells 2, such as shown in FIG. 5. Each cell 2 is served by a base transceiver station BTS which transmits signals and receives signals from terminals MS located in the associated cell. These terminals MS may be mobile stations and able to move between the cells 2. The mobile terminals MS will thus communicate with the base transceiver station BTS serving the cell in which the particular mobile station is located. When a mobile station MS moves from one cell 2 to another, handoff (also known as "handover") will occur. In other words, the mobile station MS will stop communicating with the base transceiver station BTS in the old cell and start communicating with the base transceiver station BTS in the new cell.

For the communication of data between mobile stations MS and base transceiver stations BTS, packet data transmission techniques are sometimes used. The data to be transmitted is divided into packets which also include information such as the address of the destination to which the packet is being sent and the identity of the packet such as its number. In known systems, it has been a problem that handoff can cause the loss of packets of data. For example, the first base transceiver station BTS will receive packets of data to be sent to a given mobile station MS. When it is determined that handoff is to take place, the packets of data will then be sent to the new base transceiver station BTS. The problem arises in that handoff may be completed before the first base transceiver station BTS has finished transmitting all of the data packers which it has received to the mobile station MS.

These untransmitted packets will then be lost.

It has therefore been proposed to send the same data packets to more than one base transceiver station. Thus, the same data packets would be sent to the first and second base transceiver stations. In this proposal, the data packets are sent to the first and second base transceiver stations. In one base transceiver station, a data packet is transmitted to the mobile station whilst in the other base transceiver station, that same packet is discarded. However, if there is not exact synchronisation between the receiving of the data packets by each of the base transceiver stations and the discarding and transmission of a given data packet, data packets may still be lost. For example, if the second base transceiver station discards the, data packets more quickly than the first base transceiver station transmits the data packets, then when handoff occurs, the second base transceiver station may try to transmit as its first data packet, the n+2th packet whilst the packet last received by the mobile station is the nth packet. In other words, the n+1th packet may be lost. This problem could be overcome by transmitting all data packets to a group of neighbouring base transceiver stations. However this proposal has the disadvantage that a high buffer overhead would be required to store the transmitted data packets. It is preferred that the buffer overhead is minimised.

It is also desired that the delay in receiving data packets should be minimised.

It is therefore an aim of embodiments of the present invention to remove or at least mitigate the problems of the known arrangements.

According to a first aspect of the present invention there is provided a method of transmitting packets of data in a communication network comprising at east first to third stations, the method comprising the steps of sending a first number of the data packets from the first station to a second station; identifying which of the first number of packets are correctly received by the second station from the first station; and sending a second number of data packets from the third station to said second station commencing with the a packet identified as being required after the last correctly received packet received from the first station.

By identifying which data packets have been received by the second station and ensuring that the next data packet which is transmitted by the third station is the next required packet, it can be ensured that even during handoff, that the second station receives all of the data packets. The next required packet may be the packet subsequent to the identified last packet or may be a data packet which is being retransmitted, the first transmission of that packet being unsuccessful.

Preferably, at least some of the packets of data to be transmitted to the second station are provided both to the first and third stations. This has the advantage that when the first station stops transmitting packets and the third station starts transmitting packets, the third station will already have the necessary packets including the packet following the identified last packet. The wireless network may comprise a common node connected to the first and third stations, said common node being arranged to transmit data packets to the first and third stations. The method may include the step of acknowledging by the second station the correct receipt of the data packet.

According to a second aspect of the present invention, there is provided a method of transmitting packets of data in a communication network comprising at least first to third stations and at least one common node, said second station arranged to be in communication with at least one of said first and third stations and said first and third stations being connected with said common node, the method comprising the steps of indicating to a common node that the second station is reachable via both of said first and third stations; transmitting the same data packets from the common node to the first and third stations; transmitting the said same data packets from at least one of the first and third stations to said second station; identifying a received packet at the third station and acknowledging receipt of that packet; and removing said acknowledged packet from data storage means.

Preferably, in both aspects, the data packets are provided both to the first and third stations when the second station has a predefined parameter with respect to the first and third stations. That predefined parameter may be defined by the geographic position of the second station with respect to the first and third stations. Thus, the circumstances in which the first and third stations receive the same data packets can be defined with respect to the location of the second station with respect to the first and third stations. In a cellular network, the location may be predefined for each cell. It should be noted that the location is preferably a zone.

Alternatively, and more preferably, the at least one predefined parameter is defined by at least one parameter of signals received from at least one of the first and third stations satisfying a predetermined criteria. The signals may be the data packets received from the first and/or third stations or alternatively may be some other signals such as control signals, reference signals etc.

The parameter may be the received power level at the second station from at least one of the first and third stations. For example, when the power level of a signal received from the first station falls below a predetermined threshold, the beginning of the location may be defined. Likewise, the end of the location may be defined by the power level of a signal received from the third station exceeds a predetermined level. Alternatively, the parameter may be the ratio of the power levels of signals received at the second station from the first and third stations.

Yet another alternative is that the parameter may be the signal quality received at the second station from the first and/or third stations. Another alternative is for the parameter to be based on the quantity of traffic, the quality of service and/or quality of the signals.

Preferably, the parameter is averaged over time before it is determined if the criteria is satisfied. Thus, anomalous readings which could adversely effect the operation of the system can be ignored.

Preferably, said predefined location includes a handoff zone in which said first station hands off to said third station in that said second station stops receiving data packets from said first station and starts receiving data packets from said third station. Preferably, the handoff zone is surrounded on either side by a zone in which the second station receives data packets from a respective one of said first and third stations, and said first and third stations are both provided with the data packets. This ensures that when handoff occurs, the third station has the next data packet to be transmitted to the second station.

When handoff takes place, said second station transmits a signal to the third station to advise the third station of which packet or packets were received from the first station and said third station transmits the data packet identified as being required after the last packet to said second station.

Preferably, the data packets are stored in the first and third stations when provided thereto. This is of advantage particularly if the data packet needs to be retransmitted due to an error. Additionally, it ensures that when handoff occurs, the third station will have the next data packet to be transmitted. When handoff takes place, the data packets preceding the next data packet to be transmitted may be discarded in the third station.

Preferably, said first and third stations are base transceiver stations whilst the second station is a mobile station. Preferably, the base stations and mobile stations are part of a cellular telecommunication network.

The common node may not be advised of the occurrence of handoff. This may be unnecessary if, for example, the first and third stations are both provided with the data packets.

It is preferred that the common node has a higher hierarchy than the first and third stations in the wireless network. However, it is possible that one of the first and second stations could also provide the common node function.

Preferably, said data storage means is in said common node and/or at least one of said first and third stations. The acknowledgement may be sent to the common node. The data storage means may comprise buffer means. The common node may associate a unique number with each packet and the same data packets, each of which is associated with the unique number, are transmitted from said common node to both of the first and third stations. The unique number may be in or associated with the packet. The common node may control the removal of said identified data packet from the or each data storage means.

The first station may be in communication with a first node and the third station may be in communication with a second node, said first and second nodes being in communication with said common node. The acknowledgement may be forwarded to the common node by one of said first and second nodes and the common node may advise the other of the first and second nodes that an acknowledgment has been received.

Alternatively, the first station is connected to a first node and the third station is connected to a second node and one of the first and second nodes is arranged to be the common node and said acknowledgements are forwarded to the common node. Preferably, the first and second nodes are connected together.

Alternatively, the first and third stations may be connected to the common node via a network.

Preferably, the acknowledgment of the receipt of a packet is sent by the second station to at least one of said first and third stations.

The data storage means may be provided in the first and third stations and the common node may be arranged to cause a transmitted packet to be removed from said data storage means of at least one of said first and third stations on receipt of an acknowledgement that said transmitted packet has been received by said second station.

The network is preferably a wireless network but may alternatively be a wired network.

The communication network may be a general packet radio system (GPRS) in which said first and third stations are base stations or base station controllers and said common node is a SGSN. The first and third stations may be in communication with different SGSNs, one of said SGSNs being designated as the common node, the other SGSN being arranged to forward acknowledgements to the common node.

Alternatively, said wireless communication network is a GPRS network and said first and second stations are SGSNs and said common node is a GGSN. In a further alternative, the first and third stations are base stations and said common node is a base station controller.

The communication network preferably has a plurality of cells and/or areas and said second station is able to register with one or more cells and/or one or more areas of said network at the same time. The decision as whether or not the second station registers with one or more cells or areas may depend on at least one predefined parameter such as discussed hereinbefore. Data packets may be provided to both of said first and third stations if the second station is registered with both of the first and third stations.

According to a further aspect of the invention, there is provided a system of transmitting packets of data in a communication network comprising:—first, second and third stations, wherein said first station is arranged to send a first number of the data packets to the second station, the second station is arranged to identify the which of the first number of packets it receives from the first station, and the third station is arranged to send a second number of data packets to the second station commencing with the data packet identified as being required after the last correctly received packet from the first station.

For a better understanding of the present invention and as to how the same may be carried into effect, reference will now be made by way of example to the accompanying figures in which:—

FIG. 1 illustrates the principles of embodiments of the present invention;

FIG. 2 schematically shows the structure of a data packet;

One embodiment of the present invention will be described in the context of a cellular telecommunications network which uses the GSM (Global System for Mobile communications) standard.

Figure 1:
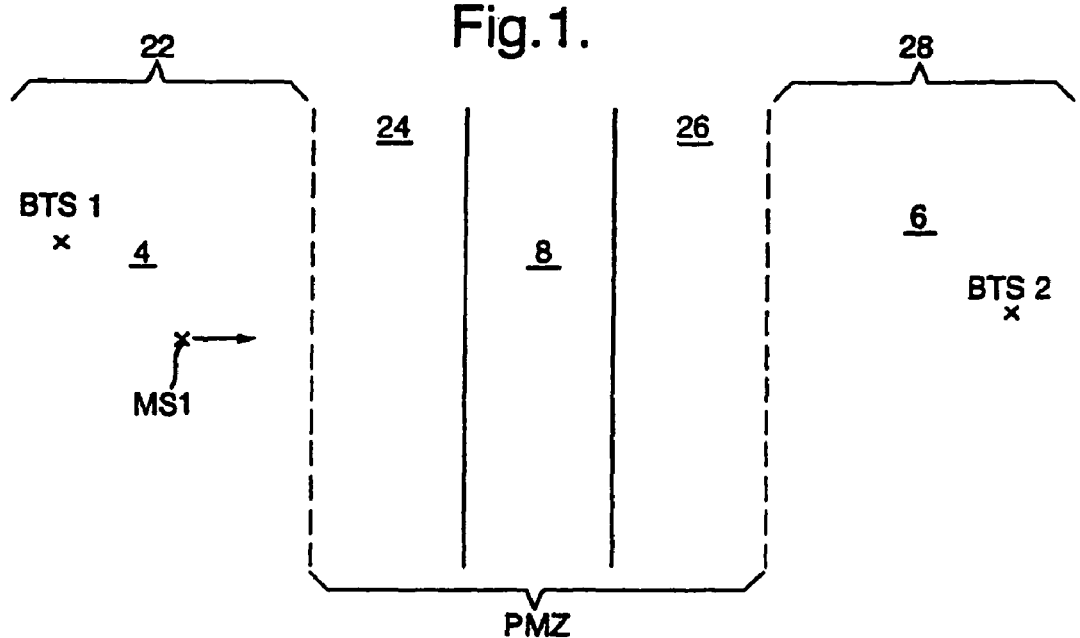

Reference will first be made to FIG. 1 which shows a first base transceiver station BTS1 and a second base transceiver station BTS2. A mobile station MS1 is currently in the cell 4 which is associated with the first base transceiver station BTS1 and is moving towards the cell 6 which is associated with the second base transceiver station BTS2. The approximate boundary between the two cells 4 and 6 is represented by region 8. It should be appreciated that, in practice, the two cells generally share the overlapping region 8. That is, the mobile station MS1, when in this region, is capable of communicating either with the first base transceiver station BTS1 or the second base transceiver station BTS2. This overlapping region a represents the handoff zone. In other words, at some point in this region, the mobile station MS1 will stop communicating with the first base transceiver station STS1 and start communicating with the second base transceiver station BTS2.

Figure 2:
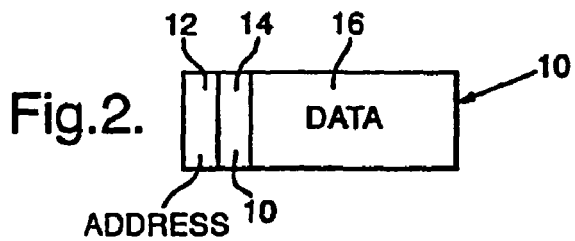
Figure 5:
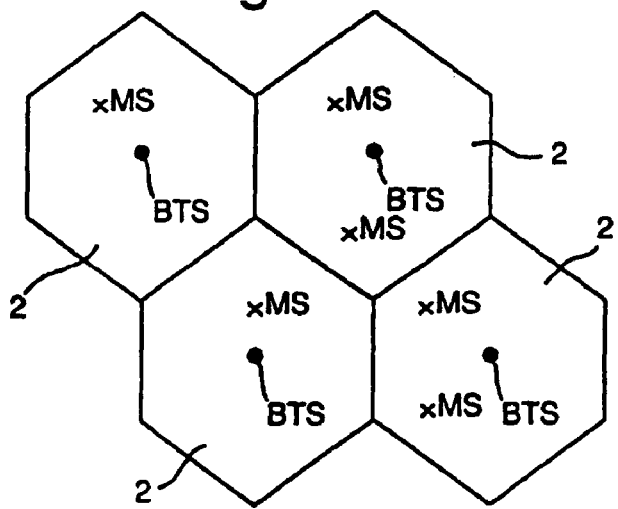
FIG. 5 shows a schematic view of a cellular telecommunications network.

Embodiments of the present invention are particularly applicable to the transmission of packets of data from base transceiver stations to a given mobile station. FIG. 2 illustrates schematically one possible structure for a data packet 10 to be transmitted from a base transceiver station to a given mobile station. The data packet may have a fixed length or, alternatively may have any suitable length. The data packet includes address information 12 which defines the mobile station to which the data packet 10 is to be sent. The data packet 10 also includes information 14 relating to the identity of the packet. For example, this identifying information 14 may comprise the number of the packet. It should be appreciated that the address information 12 and the identifying information 14 may be of predetermined length and occupy predetermined locations in the data packet. This is followed by the data 15 to be transmitted to the mobile station. It should be noted that the order of the address information 12, the identifying information 14 and the data 16 may be altered in accordance with the data packet format being used for a particular application.

Figure 4:
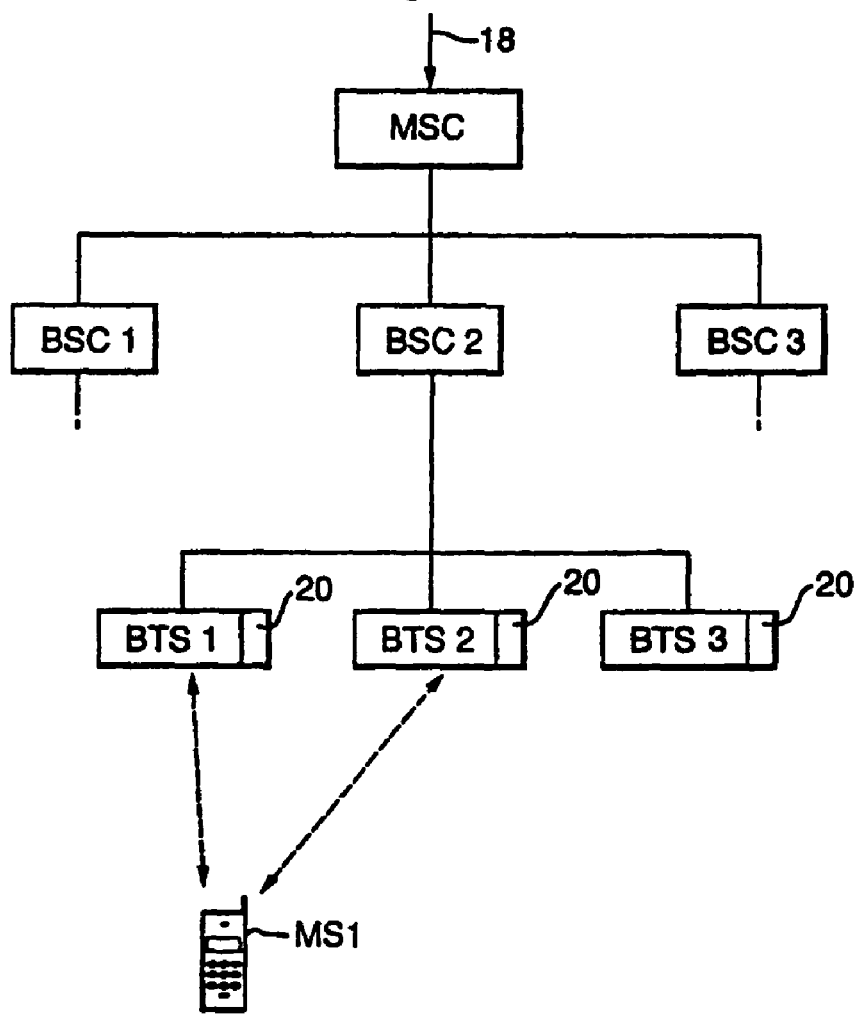
FIG. 4 shows a schematic view of elements of a cellular telecommunications network.

Reference will now be made to FIG. 4 which schematically shows some of the elements of a cellular telecommunications network. As can be seen, the first and second base transceiver stations BTS1 and BTS2 are connected to a base station controller BSC2. As can be seen from FIG. 4, a third base transceiver station BTS3 is also connected to the same base station controller BSC2 as the first and second base transceiver stations BTS1 and BTS2. In practice, each base station controller 2 can be connected to any number of base transceiver stations.

As can be seen, three base station controllers BSC1-3 are shown in FIG. 4. It should be appreciated that the first and third base station controllers BSC1 and BSC3 are also each connected, in general, to a number of base transceiver stations which have not been shown in the interests of clarity. Each of these base station controllers BSC1-3 is connected to a mobile switching centre MSC. Again, it should be appreciated that the mobile switching centre MSC can be connected to any number of base station controllers. Furthermore, a cellular telecommunications network will generally include a number of mobile switching centres MSC. The mobile switching centre receives an input 18 which comprises the data packets which are to be transmitted to the mobile station MS1. The mobile switching centre MSC passes the data packets to the base station controller BSC2 which controls the base transceiver station BTS1 with which the mobile station is currently communicating and possibly the base transceiver station BTS2 with which the mobile station MS1 is likely to communicate with in the future. In the case of the embodiment shown in FIG. 4, the packets of data will be passed to the second base station controller BSC2. Depending on the location of the mobile station MS1 with respect to the first base transceiver station BTS1 and the second base transceiver station BTS 2, the base station controller BSC2 will do one of the following:

(a) Transmit the data packets only to the first base transceiver station BTS1;

(b) Transmit the data packets both to the first and second base transceiver stations BTS1 and BTS2; or (c) Transmit the data packets only to the second base transceiver station BTS2.

Each base transceiver station BTS1-3 is provided with a memory 20 in the form of a buffer which is able to store the packets of data received from the base station controller BSC2.

Figure 3:
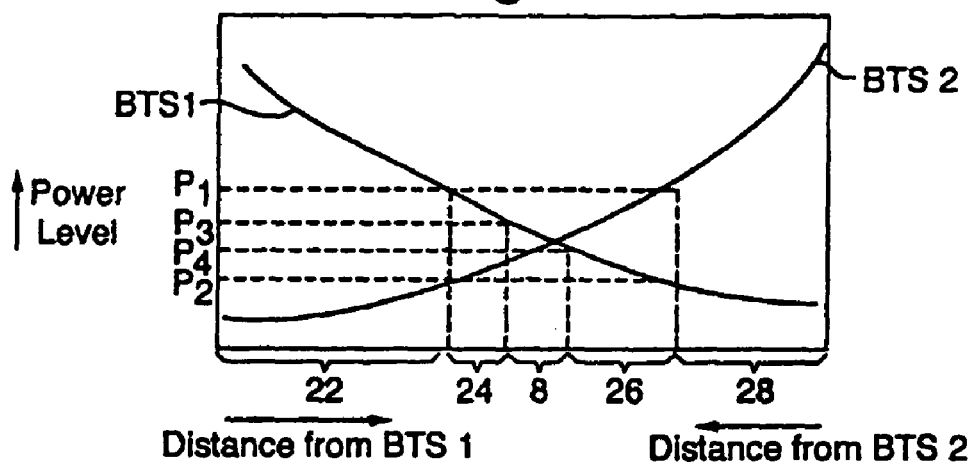
FIG. 3 shows the power levels of signals received at a mobile station from two adjacent base transceiver stations versus distance.

Referring back to FIG. 1 and to FIG. 3, an embodiment of the present invention will now be explained. Initially, the mobile station MS1 is in the cell 4 associated with the first base transceiver station BTS1. This corresponds to the part of the graph indicated by reference number 22 in FIG. 3. As can be seen, the power of the signal received from the first base transceiver station BTS1 by the mobile station is very much greater than the power level of the signal received from the second base transceiver station BTS2. Accordingly, the data packets will be transmitted from the base station controller 2 only to the first base transceiver station 1. The data packets will then be transmitted by the first base transceiver station BTS1 to the mobile station MS1.

An automatic retransmission protocol is also used so that if the mobile station MS1 does not correctly receive a data packet, the mobile station MS1 advises the first base transceiver station BTS1 of this. The first base transceiver station BTS1 will then retransmit the incorrectly received data packet.

The next data packet will only be transmitted once the first base transceiver station STS1 has received an acknowledgement from the mobile station MS1 that the previous packet has been correctly received. Of course, if the first base transceiver station STS1 receives an indication from the mobile station MS1 that it has not correctly received the data packet, then that data packet is retransmitted. Accordingly, the data packet is retained in the buffer 20 until confirmation has been received that a packet has been correctly received. It is also possible to use a window method. In this method, a predetermined number of packets are transmitted and an acknowledgement is only required after the predetermined number of packets have been transmitted.

The mobile station MS1 now enters a zone 24 which is adjacent to the handoff area S. As can be seen from FIG. 3, the difference between the power level of the signal received from the first base transceiver station BTS1 and the second base transceiver station BTS2 at the mobile station MS1 is becoming smaller. As soon as the mobile station enters this zone 24, the mobile station sends a signal to the first base transceiver station BTS1 which causes that first base transceiver station BTS1 to send a signal to the base station controller BSC2. This signal is a message sent through the first base station BTS1 to the base station controller BSC2 which informs the base station controller that the mobile is now registered in both cells. This signal therefore provides a cell update for both the cell handled by BTS1 and the cell handled by BTS2. That signal causes the base station controller BSC2 to transmit the data packets both to the first base transceiver station BTS1 and to the second base transceiver station ETS2. This is because the base station controller BSC2 considers that the mobile station MS1 is reachable through both the first and second base stations BTS1 and BTS2. However, only the first base transceiver station BTS1 will transmit the data packets to the mobile station MS1 whilst the mobile station MS1 is in zone 24. It should be noted that the buffer 20 provided in each base transceiver station BTS1-3 has a finite size so that packets older than a given threshold will be discarded. Accordingly, whilst the first base transceiver station BTS1 is transmitting the data packets to the mobile station MS1, the second base transceiver station BTS2 will discard the older data packets at a rate which corresponds to the rate at which data packets are received by the second base transceiver station STS2.

In one alternative, the first base station BTS1 could advise the second base station BTS2 of the proper receipt of a packet directly if the two base stations are connected or indirectly via the base station controller BSC2. In the latter situation, the base station controller BSC2 forwards the indication to the second base station BTS2. The second base station STS2 will remove the acknowledged packet from its buffer.

As the mobile station MS1 continues to move towards the second base transceiver station BTS2, the mobile station will enter the handoff zone 8. As shown in FIG. 3, the power level of the signal received at the mobile station MS1 from the first and second base transceiver stations will be of a similar level. Handoff will occur at some point as the mobile station MS1 travels through this zone. The base station controller BSC2 continues to transmit the data packets to both the first base transceiver station BTS1 and the second base transceiver station BTS2. However, the first base transceiver station BTS1 will stop transmitting data packets to the mobile station MS1 and the second base transceiver station BTS2 will start transmitting packets to the mobile station MS1.

It should be noted that in terms of the data packet communication, hard handoff will be operated. In other words, the connection between the mobile station MS1 and the first base transceiver station BTS1 will be terminated before the connection is made between the mobile station MS1 and the second base transceiver station BTS2. When the connection between the first base transceiver station BTS1 and the mobile station MS1 is terminated, the mobile station will know the identity of the last correctly received packet from the first base transceiver station. After the connection has been established with the second base transceiver station BTS2, the mobile station MS1 will send the identity of the last correctly received packet to the second base transceiver station BTS2. The identity sent to the second base transceiver station BTS2 by the mobile station MS1 may be encoded so as to prevent corruption and may include, for example check digit information or the like.

The second base transceiver station BTS2 will then discard all the packets in its buffer 20 up to and including the last identified data packet. The second base transceiver station BTS2 will then start transmitting data packets from the buffer 20. In particular, the second base transceiver station BTS2 will send the data packet immediately succeeding the last packet correctly received by the mobile station MS1 from the first base transceiver station BTS1. Any packet which requires retransmission may not be discarded and instead may be retransmitted.

It should be noted that there is no need to advise the base station controller that handoff has occurred between the first and second base transceiver stations BTS1 and BTS2. This is because the base station controller BSC2 continues to send data packets to both the first and the second base transceiver stations BTS1 and BTS2.

Zone 26 is similar to zone 24 in that the data packets will be sent to both the first and the second base transceiver stations BTS1 and BTS2 and in that only one base transceiver station, in this case the second base transceiver station BTS2, transmits to the mobile station MS1. As can be seen from FIG. 3, the level of the signal received at the mobile station MS1 from the second base transceiver station BTS2 is increasing relative to the received level of the signal from the first base transceiver station BTS1.

When the mobile station reaches the edge of zone 26 and moves into region 28, the level of the signal received from the second base transceiver station BTS2 will be very much higher than that received from the first base transceiver station BTS1. This can be seen from FIG. 3. Accordingly, at this point the mobile station MS1 will advise the second base transceiver station BTS2 that the edge of zone 26 has been reached. This information is passed on to the base station controller BSC2 which stops sending the data packets to the first base transceiver station BTS1 and instead sends the data packets only to the second base transceiver station BTS2.

The zone defined by regions 24, 8 and 26 constitutes a multicast zone in which the data packets are transmitted to both the first and the second base transceiver stations BTS1 and BTS2.

There are a number of different ways in which the zones 24, 8 and 26 can be defined. For example, these zones may be predefined. In this embodiment, the location of the mobile station with respect to the first and second base transceiver stations BTS1 and BTS2 would be determined. For example, region 24 would occur when the mobile station is between x and y meters from the first base transceiver station and a and b meters from the second base transceiver station BTS2. In other words, the regions have fixed geographic locations with respect to the first and second base transceiver stations BTS1 and STS2.

However, a more preferred method of defining these regions is to rely on received level of the signals from the respective base transceiver stations. Thus, the beginning of region 24 occurs when the received power level of the signal from the first base transceiver station BTS1 is less than the value P1. Likewise, the end of region 26 is defined as occurring when the power level of the signal received from the second base transceiver station exceeds the value P1. Alternatively, the beginning of region 24 can be defined as the point when the signal received from the second base transceiver station exceeds the threshold level P2. Likewise, the end of region 26 can be defined as occurring when the signal received from the first base transceiver station falls below level P2.

The beginning of the handoff region 8 can be defined as occurring when the level of the signal received from the first base transceiver station BTS1 falls below the power level P3, which is between levels P1 and P2. Likewise, the end of the handoff region 8 can be defined as when the signal received from the first base transceiver station BTS1 has fallen below the value P4 where P4 is between values P3 and P2.

In embodiments of the present invention, at is not necessary to use both the values of P1 and P2. Whilst these values have been shown as occurring at the same time for the received power levels of the signals from the different base transceiver stations, in is practice this may not occur and accordingly, it is more preferably to use the value P1 which is indicative that the signal from the closer base transceiver station has exceeded a given value. In summary, the decision as to the location of the beginning and end of each zone may be defined only by the levels of the signals received from the first base station or the second station.

Alternatively the beginning and/or end of at least one zone may be defined only by the power level of the signals received from the first base transceiver station BTS1 whilst the beginning and/or end of at least one zone may be defined only by the power level of the signals received from the second base transceiver station. Additionally or alternatively both the received power level of signals from both the first and second base transceiver stations may be used to define the beginning and/or end of a zone.

In an alternative embodiment of the present invention, instead of looking at the absolute power levels of the signal received at the mobile station MS1 from the first and/or second base transceiver station STS1 and BTS2, the ratio between those signals can be considered. For example, the beginning of the region 24 may be defined as occurring when PRBTS1/PRBTS2 $\leq R_1$, where PRBTS1 is the power level of the signal received from the first base transceiver station at the mobile station MS1 and PRBTS2 is the power level of the signal from the second base transceiver station received at the mobile station MS1. $R_1$ is a threshold value. Likewise, the end of zone 26 may be defined by PRBTS2/PRBTS1 $>R_2$ where $R_2$ is a different threshold value. The beginning and end of the handoff region 8 can be defined in a similar manner.

It is of course possible to use other parameters in order to determine the location of the various regions. For example, instead of power level, signal quality or quantity may be used or the values may be based on the amount of traffic. Alternatively, the location of the regions can be determined based on the quality of service required by a mobile station. This may depend on the application required by the mobile station. For example speech has a lower requirement than data. The regions may be therefore smaller for data than speech.

For those embodiments of the present invention which rely on measurements of conditions within the cellular network in order to define the location of the regions, it is preferred that decisions be made on the basis of average values rather than instantaneous values. For example, in the case where the power level of the signals received from the first and/or second base transceiver stations are used in order to determine the location of the region, the level of the signals used is based on an average. This is so as to avoid anomalous increases or decreases in the signal from providing false results. The level of the signal may be averaged over a predetermined number of frames.

It should be noted that the same protocol relating to the acknowledgement and retransmission of incorrectly received data packets also takes place in zones 24, 8 and 26.

It should be noted that the transmission of the data packets may take place within allocated slots in frames. However, it is also possible that the timing of the sending of the data packets be independent of the time slot and frame structure.

The power level measurements may be based on the power level of the data packets received from the base transceiver station or alternatively may be based on other channels which may be in operation at the same time such as a control channel or the like.

The size of the buffer can be determined based on trial and error measurements. The buffer 20 may be a FIFO.

It should be noted that in embodiments of the present invention, there is no reason why the regions 24 and 26 should be of the same size. One or other of those regions may be larger than the other. However, in practice it is likely that both of these regions will be of a similar size.

The base switching center BSC2 may be arranged to contain a routing table which stores the base transceiver stations to which the data packets are to be broadcast.

It should be appreciated that whilst the present invention has been described in the context of a GSM system, embodiments of the present invention are equally applicable to other access systems including other types of time division multiple access systems, frequency division multiple access systems, base division multiple access systems, spread spectrum multiple access systems such as code division multiple access and hybrids thereof. In one implementation of embodiments of the present invention in code division multiple access systems, whilst soft handoff may be used, the packets which are to be transmitted may or may not be transmitted to the mobile station by more than one base transceiver station at a time. Soft handoff is where the same signal is received by a mobile station from more than one base transceiver station.

The embodiment described hereinbefore shows the simultaneous transmission of data packets to two base transceiver stations at the same time. It is of course possible that more than two base transceiver stations could receive the same data packets. It is also possible that the first and second base transceiver stations could receive the same data packets with the following data packets being received by the second and a third base transceiver station.

Where the adjacent base transceiver stations are not controlled by a common base station controller, the same data packets would then be supplied to two different base station controllers which then, when appropriate, would supply the two adjacent base transceiver stations with the same data packets.

In one modification to the embodiment described hereinbefore, the buffer in the base transceiver stations could be omitted and instead included in the base station controller. In this modification, the acknowledgement which the base transceiver station receives from the mobile station would then be transmitted to the base station controller. If a packet needed to be retransmitted, the packet would be sent again to the base transceiver station. Thus, when handoff occurs, the base station controller would have the identity of the last acknowledged packet received by the mobile station. The base station controller would then be able to send to the new base transceiver station, the next data packet to be transmitted.

Figure 6:
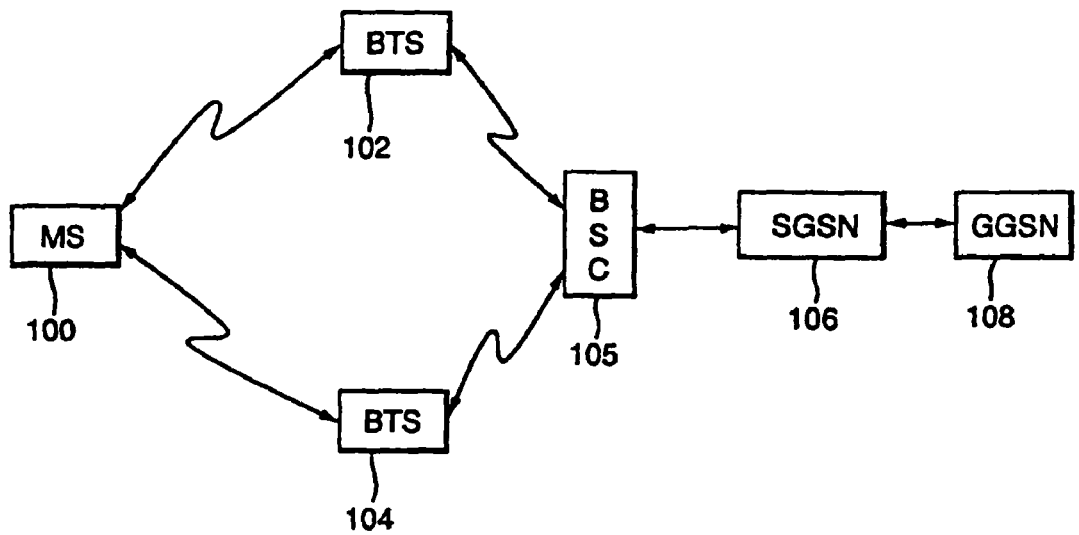
FIG. 6 shows an alternative embodiment of the present invention in a GPRS network.
Figure 7:
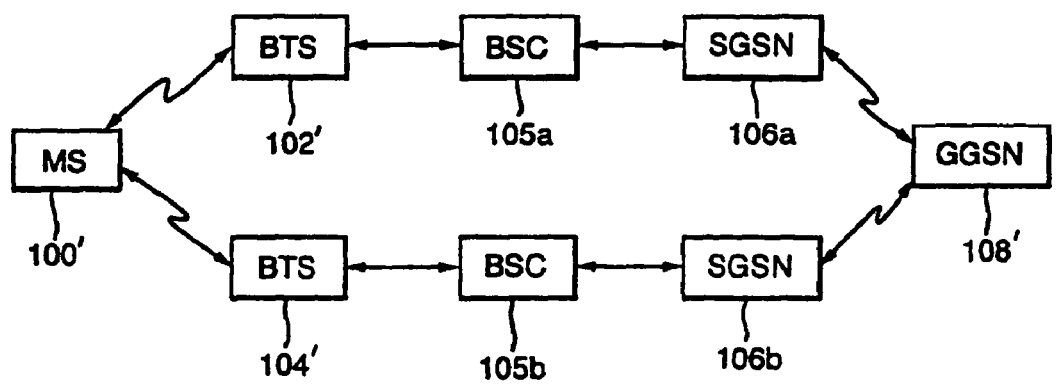
FIG. 7 shows a modification to the embodiment shown in FIG. 6.

Reference will now be made to FIGS. 6 and 7 which show an alternative implementation of the present invention in a general packet radio service (GPRS) network. Referring first to FIG. 6, a mobile station 100 is arranged to communicate with more than one base station 102 and 104, for example when in soft handoff. The two base stations 102 and 104 are connected to the same base station controller 105 which is connected to a serving GPRS support node (SGSN) 106. The SGSN 106 is connected to a gateway GPRS support node 108 (GGSN). The SGSN 106 stores information. Identifying the or each cell in which the mobile station 100 is currently located. When the mobile station 100 is able to communicate with more than one cell and has registered in more than one cell, the mobile station is considered to be in more than one cell by the SGSN. The description hereinafter will consider the simplified case where the mobile station communicates with only two base stations, which occurs when the mobile station is located in region 8 of FIG. 1. The mobile station may communicate with more than two base stations at the same time. When a data packet is to be transmitted to the mobile station 100, the SGSN 106 will forward the packet, received from the GGSN 108, to the base station controller 105 which will in turn forward the packet to both of the base stations 102 and 104 which serve the respective cells in which the mobile station 100 is located. In this embodiment, both of the base stations 102 and 104 are controlled by the same base station controller 105. Accordingly the SGSN 106 only sends the packet once to the base station controller 105 along with an indication that the packet has to be forwarded to both of the base stations 102 and 104. One or both base stations 102 and 104 will transmit the same packet to the mobile station 100. The packets received by the mobile station 100 may be acknowledged via the base station 102 or 104 from which the first received packet is transmitted. Alternatively, the acknowledgement can be sent via either or both of the base stations, regardless of which base station transmitted the acknowledged packet. The base station 102 and/or 104 transmits the acknowledgement to the base station controller and/or SGSN 106. It should be noted that the acknowledgement confirms that the packet has been correctly received.

When the base station controller or the SGSN 106 receives the acknowledgement from the respective base station 102 or 104, it will know that the data packet has been correctly received. The data packets may be buffered in the base stations 102 and 104, the base station controller 105 or SGSN 106. In either case, the receipt of an acknowledgement will cause the packet in question to be removed from the buffering of the base station the base station controller or the SGSN 108. Typically, in a time division multiple access system (TDMA), a mobile station communicates with one base station at a time whilst in a code division multiple access system (CDMA), a mobile station can communicate with more than one base station at the same time. In both access systems, if uplink packets are correctly received by only one base station, the base station controller or SGSN connected thereto can deduce that the best path to the mobile station is likely to be via that one base station. If or when the mobile station receives the same packet for the second time, the mobile station will identify that the packet has already been received and delete that second packet and will not acknowledge that second packet.

In the GPRS network, each data packet is provide with a unique identifier. The mobile station 100 can use this identifier to determine when duplicate packets are received. Each packet may include information identifying the base station from which the data packet has been received.

It is alternatively possible that a mobile station can pass the acknowledgement to any of the base stations with which it is registered or with which it is communicating and not just the base station from which it first received a given data packet. For example, in a GPRS network, a mobile station might have acknowledged a packet from first base station and then move to the cell associated with a second base station. When this occurs, the mobile station may resend the acknowledgement to the second base station so that the second base station deletes the acknowledged packet from its buffer and then transmits the next packet to the mobile station.

Reference will now be made to FIG. 7 which also shows a possible arrangement in the GPRS network. In this arrangement, the mobile station 100' is also registered or in communication with more than one base station 102' and 104'. In other words each data packet is transmitted by both of the base stations 102' and 104'. Unlike the arrangement of FIG. 6, each of the two base stations 102' and 104' are connected via different base station controllers 105a and 105b to different SGSNs 106a and 106b. Each of the SGSNs 106a and 106b is connected to a GGSN 108'. There are three ways in which this arrangement could operate in practice.

In the first method of operation, the acknowledgement layer is extended back to the GGSN 108'. In other words when the first packet to be received by the mobile station 100', an acknowledgement is sent by the mobile station 100' to the base station which has sent the first received packet. That base station passes the acknowledgement on to the SGSN to which that base station is connected via the associated base station controller. That SGSN then passes the acknowledgement to the GGSN 108'. The GGSN 108' will then know that the packet has been correctly received. If a data packet is to be retransmitted, this will be done by the GGSN 108'. Thus in the arrangement of FIG. 6 the control of the transmission and retransmission of the data packets is controlled by the SGSN to which both the base stations are connected. In contrast, the first method of operation of the arrangement of FIG. 7 the GGSN 108' controls the transmission and retransmission of data packets.

In the second method of operation, the acknowledgement mechanism is extended between the GGSN 108' and the mobile station 100' but coordination between the SGSNs 106a and 106b and the GGSNs 108' is provided. Retransmission may be controlled by the SGSNs. The GGSN 108' includes in each data packet to be transmitted a first identification number. Each SGSN 106a and 106b then adds a second identification number (logical link control LLC number) to each data packet. When the mobile station 100 sends its acknowledgement it include both the first and second identification numbers. This can then be dealt with in two ways. In the first way, the SGSN receiving the acknowledgment from the mobile station (via a base station and base station controller) sends an acknowledgement using the first identification number to the GGSN 108'. The GGSN 108' then advises the other SGSN that the data packet identified by the first identification number has been correctly received.

Alternatively, the SGSN receiving the acknowledgement can advise the other SGSN directly that the data packet has been received. This requires a connection between the SGSNs. It also requires that the SGSNs are able to identify other SGSNs to which a mobile station is coupled from, for example, the second identification number. The acknowledgement can thus be at the LLC level (logical link control) which means that the acknowledgement is from the mobile station to the GSN. The acknowledgement may alternatively be at the RLC level (radio link control) which is from the mobile station to the base station and/or to the base station controller.

In one embodiment, one SGSN 106a or 106b is designated as the anchor SGSN. The anchor SGSN can also be referred to as a dominant node. The other SGSN is used only to route data. The anchor SGSN will have all the subscriber data and perform various GPRS functions such as SNDCP (subnetwork dependent convergence protocol) compression and LLC (logical link control) ciphering. The data packets received by the anchor SGSN are thus suitably processed and forwarded to the base station connected thereto via the appropriate base station controller. The data packet is also forwarded to the other SGSN by the anchor SGSN which in turn forwards the packet to the other base station which is in communication with the mobile station, again via the appropriate base station controller. The other SGSN thus stores information so that it can identify the base station controller and the base station to which a given packet should be forwarded. The SGSN also stores information as to the anchor SGSN for each mobile station in a cell associated with that SGSN. All acknowledgements of the data are forwarded to the anchor SGSN either via the base station and base station controller connected thereto or from the other SGSN.

It should be appreciated that this method requires a mobile station to designate one of the base stations to which it is connected as the main base station. The main base station is the base station connected to the anchor SGSN. The mobile station will only deregister from its anchor base station if a connection is poor. If the mobile station changes its anchor base station and/or a secondary base station to which it is connected, it is necessary to ensure that the system carries out the necessary updates so that the anchor and other base stations are correctly identified.

In a modification to the embodiments described in relation to FIG. 7, a network (eg ATM) is arranged between all of the SGSNs and all the base stations. With this modification, each base station just needs to know to which SGSN the mobile station is connected. Each base station which is connected to a mobile station will each transmit the same data packets to mobile station. Each base station which is connected to the same mobile station will forward acknowledgements from the mobile station to the associated SGSN. This method operates in a similar manner to that shown in FIG. 6.

In the arrangements described in relation to FIG. 7, data packets will be buffered in the base stations 102' and 104' and/or the base station controller 105a and 105b and/or the SGSNs 106a and 106b. The receipt of an acknowledgement of a particular data packet will cause the data packet to be removed from buffering in the base stations 102' and 104' and/or the SGSNs 106a and 106b.

In the embodiments of FIGS. 6 and 7, data packets will be retransmitted if an acknowledgement is not received within a predetermined time. In both of the arrangements shown in FIGS. 6 and 7, a mobile station is arranged to register with a base station if that mobile station is in its cell. As will be apparent from the previous description, a mobile station can be in more than one cell at the same time. When a mobile station leaves a cell, the mobile station will deregister from that cell. Depending on the implementation of the embodiments of the present invention, the registration of the mobile station with a given base station can be passed to one or more SGSNs and/or the GGSN and/or the base station controllers. If the two base stations are connected to two different SGSNs, the mobile station may be registered with two different SGSNs. This information will be stored by or at least available to the GSN. If the cells belong to two different routing areas, the registering and deregistering signals will update both of the associated SGSNs, if the two routing areas are associated with different SGSNs. In this arrangement, the SGSNs provide area controllers. However, in alternative embodiments of the present invention, the controller can be provided in any suitable location. It should be appreciated that a routing area generally comprises a plurality of cells and constitutes the area of which paging takes place in GPRS. A routing area is similar to the location area of the GSM standard.

It should be appreciated that in implementation of the present invention both of the arrangements of FIGS. 6 and 7 may be included in the same network. For convenience, in both of the arrangements shown in FIGS. 6 and 7, the mobile station is shown as communicating with two base stations at the same time. Each mobile station can of course communicate with more than two base stations at the same time in certain circumstances.

In the embodiments described in relation to FIGS. 6 and 7, it is assumed that the mobile station might be registered in two cells or in a soft handoff situation. However, at other times, the mobile station will only be in a single cell. When the mobile station is on the border with a second cell, the mobile station will send a request to see if the mobile station can now additionally register with the base station associated with that other cell. The mobile station will then be advised as to whether or not a connection can be made to the base station of the second cell before the mobile station attempts any such connection.

If such a connection is permitted, any necessary connections and exchange of information between SGSNs and the GSN as well as between SGSNs themselves can be set up before the mobile station makes any connection with the base station associated with the second cell. Packets of data could thus be forwarded to the base station of the second cell or the associated SGSN before the connection between the mobile station and the base station of the second cell has been established.

In one possible implementation, the mobile station sends along with update information to the registers, a list of data packets which have been received so that the correct subsequent data packets are sent by the second base station. This feature is particularly advantageous in a hard hand off situation where the mobile station is in communication with only one base station at the same time.

It should be appreciated that the arrangement shown in relation to FIGS. 6 and 7 can be modified to work in a hard handoff situation as well as or instead of in the soft handoff situation discussed hereinbefore, similar to that described in relation to FIGS. 1 to 5. In particular, in a CDMA system the base stations may be arranged so that only one base station at a time transmits data packets. However, more than one base station could receive the packets at the same time. The term base station controller is sometimes associated with the GSM standard. In other systems such as the CDMA system, a radio network controller provides a similar function to that described in relation to the base station controller hereinbefore. The term base station controller should in the context of this document be interpreted to include base station controllers as well as radio network controllers.

Aspects of the arrangements described in relation to the embodiments described in relation to FIG. 1 to 5 may be incorporated in the arrangements described in relation to FIGS. 6 and 7 and vice versa.

In the context of this document, the term connection can be a wired connection or a wireless connection. Direct connections may be provided between base stations in some embodiments of the present invention.

Embodiments of the present invention are applicable to any hierarchical wireless or wired communication system. The packet data may be sent to two station base controllers instead of to two base stations.

The embodiments described hereinbefore have been in the context of a wireless network. However embodiments of the invention may also be applicable to wired networks.

The invention claimed is:

1. A method comprising:
   transmitting data packets from a common node to first and third stations;
   receiving at said common node an acknowledgement forwarded to the common node by one of first and second nodes; and advising the other of the first and second nodes that said acknowledgment has been received, wherein said first station is in communication with said first node, said third station is in communication with said second node, said first and second nodes are in communication with said common node, and said third station is configured to send data packets to a second station commencing with a packet identified as being required after a last correctly received packet received at the second station from the first station.

2. A method as claimed in claim 1, further comprising:
receiving at the third station from the second station acknowledgement of correct receipt of the packet identified as being required by the second station.

3. A method as claimed in claim 2, further comprising:
transferring said acknowledgement to the common node.

4. A method as claimed in claim 1, further comprising:
receiving at the third station an identification of the last packet correctly received by said second station from the first station, and transmitting from the third station to the first station a packet subsequent to the last correctly received packet.

5. A method as claimed claim 1, further comprising:
receiving at the third station copies of packets of data received at the first station for transmission to the second station.

6. A method as claimed in claim 5, further comprising:
receiving said copies of data packets when the second station has at least one predefined parameter with respect to said first and third stations.

7. A method as claimed in claim 6, wherein said predefined parameter is defined by the geographic position of the second station with respect to the first and third stations.

8. A method as claimed in claim 6, wherein said at least one predefined parameter is defined by at least one parameter of signals received from at least one of said first and third stations satisfying a predetermined criteria.

9. A method as claimed in claim 8, wherein said signal parameter is the power level of a signal received at the second station from at least one of said first and third stations.

10. A method as claimed in claim 8, wherein said signal parameter is the ratio of power level of signals received at the second station from the first and third stations.

11. A method as claimed in claim 8, wherein said signal parameter is the quality of the signal received at the second station from at least one of said first and third stations.

12. A method as claimed in claim 8, wherein said signal parameter is the quantity of traffic associated with at least one of said first and third stations.

13. A method as claimed in claim 8, wherein said parameter is averaged over time before it is determined when said criteria is satisfied.

14. A method as claimed in claim 6, wherein said predefined parameter is the quality of signals associated with at least one of said first and third stations.

15. A method as claimed in claim 6, wherein said predefined parameter defines a handoff zone in which said first station hands off to said third station in that second station stops receiving data packets from said first station and starts receiving data packets from said third station.

16. A method as claimed in claim 15, wherein said handoff zone is surrounded on either side by a zone in which the second station receives data packets from a respective one of said first and third stations and said first and third stations are provided with the same data packets.

17. A method as claimed in claim 1, further comprising:
receiving at the third station from said second station a signal advising the third station of which packet or packets were received at the second station from the first station, and transmitting from said third station the data packet identified as being required after the last packet to said second station.

18. A method as claimed in claim 1, wherein when said second station does not correctly receive a data packet, said second station requests retransmission of said data packet.

19. A method as claimed in claim 1, further comprising:
storing data packets at the third station when received thereat.

20. A method as claimed in claim 19, further comprising:
discarding at the third station, the data packets preceding a next data packet to be transmitted.

21. A method as claimed in claim 1, wherein the common node associates a unique number for each packet and the same data packets, each of which is associated with the unique number are transmitted from said common node to both of the first and third stations.

22. A method as claimed in claim 1, wherein the common node controls the removal of said identified data packet from a data storage.

23. A method as claimed in claim 1, wherein the first station is connected to a first node and the third station is connected to a second node and one of the first and second nodes is arranged to be the common node and acknowledgements are forwarded to the common node.

24. A method as claimed in claim 1, wherein the first and second nodes and/or the first and third stations are connected together.

25. A method as claimed in claim 1, wherein the first and third stations are connected to the common node via a network.

26. A method as claimed in claim 1, wherein a data storage is provided in said common node.

27. A method as claimed in claim 1, wherein said transmitting is in a communication network, and wherein said network is a wireless network.

28. A method as claimed in claim 1, wherein said first and third stations are base stations.

29. A method as claimed in claim 1, wherein the first and third stations are base station controllers.

30. A method as claimed in claim 1, wherein said first and third stations are part of a general packet radio system and said common node is a serving general packet radio service support node.

31. A method as claimed in claim 30, wherein packets of data are forwarded to at least one serving general packet radio service support node prior to any connection being established with said second station.

32. A method as claimed in claim 1, wherein said first and second nodes are serving general packet radio service support nodes of a general packet radio service network and said common node is a gateway general packet radio service support node.

33. A method as claimed in claim 1, wherein said common node is a base station controller.

34. A method as claimed in claim 1, wherein the common node is not advised of the occurrence of handoff.

35. A method as claimed in claim 1, wherein said second station is a mobile station.

36. A method as claimed in claim 1, wherein said second station is able to register with one or more of a plurality of cells or areas of a communication network at the same time.

37. A method as claimed in claim 1, wherein packets of data are forwarded to at least one of said first and third stations before a connection is made with said second station.

38. A system, comprising:
first, second and third stations, wherein said first station is configured to send a first number of data packets to the second station, the second station is configured to identify which of the first number of packets it receives from the first station, and the third station is configured to send a second number of data packets to the second station commencing with a data packet identified as being required after a last correctly received packet from the first station;
a first node in communication with said first station;
a second node in communication with said third station; and
a common node in communication with said first and second nodes, wherein an acknowledgement is forwarded to the common node by one of said first and second nodes, and the common node is configured to advise the other of the first and second nodes that said acknowledgement has been received.

39. An apparatus, comprising:
a transmitter configured to transmit data packets from the apparatus to first and third stations;
a receiver configured to receive at the apparatus an acknowledgement forwarded from one of first and second nodes; and
a controller configured to advise the other of the first and second nodes that said acknowledgment has been received,
wherein said first node is in communication with said first station, said second node is in communication with said third station, said first and second nodes are in communication with said apparatus, and said third station is configured to send data packets to a second station commencing with a packet identified as being required after a last correctly received packet received at the second station from the first station.

40. An apparatus as claimed in claim 39, further comprising:
a memory configured to store data packets prior to transmission from said third station to said second station.

41. An apparatus as claimed in claim 40, wherein said memory comprises a buffer.

42. An apparatus as claimed in claim 39, wherein said third station is configured to receive copies of data packets received at the first station for transmission to said second station.

43. An apparatus as claimed in claim 39, wherein the controller is configured to associate a unique number for each packet and the same data packets, each of which is associated with the unique number are transmitted from said apparatus to both of the first and third stations.

44. An apparatus as claimed in claim 39, wherein the controller is configured to control the removal of said identified data packet from a data storage.

45. An apparatus as claimed in claim 39, further comprising a data storage at said apparatus.

46. An apparatus as claimed in claim 39, wherein said first and third stations are part of a general packet radio system and said apparatus is a serving general packet radio service support node.

47. An apparatus as claimed in claim 39, wherein said first and second stations are serving general packet radio service support nodes of a general packet radio service network and said apparatus is a gateway general packet radio service support node.

* * * * *